March 15, 1938. H. C. EDWARDS 2,111,282
INTERNAL COMBUSTION ENGINE
Filed June 7, 1934
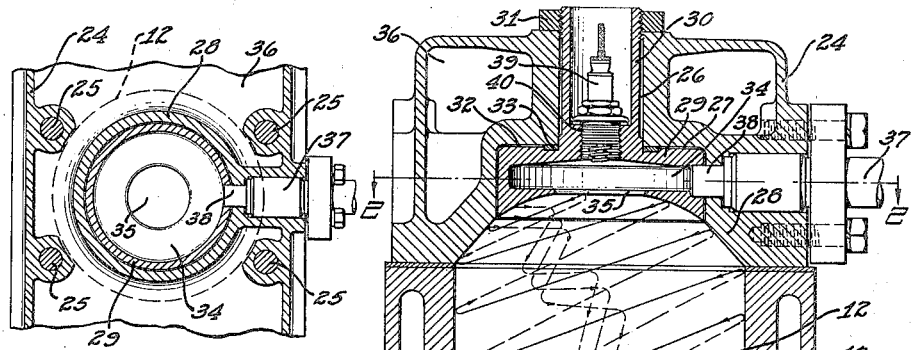
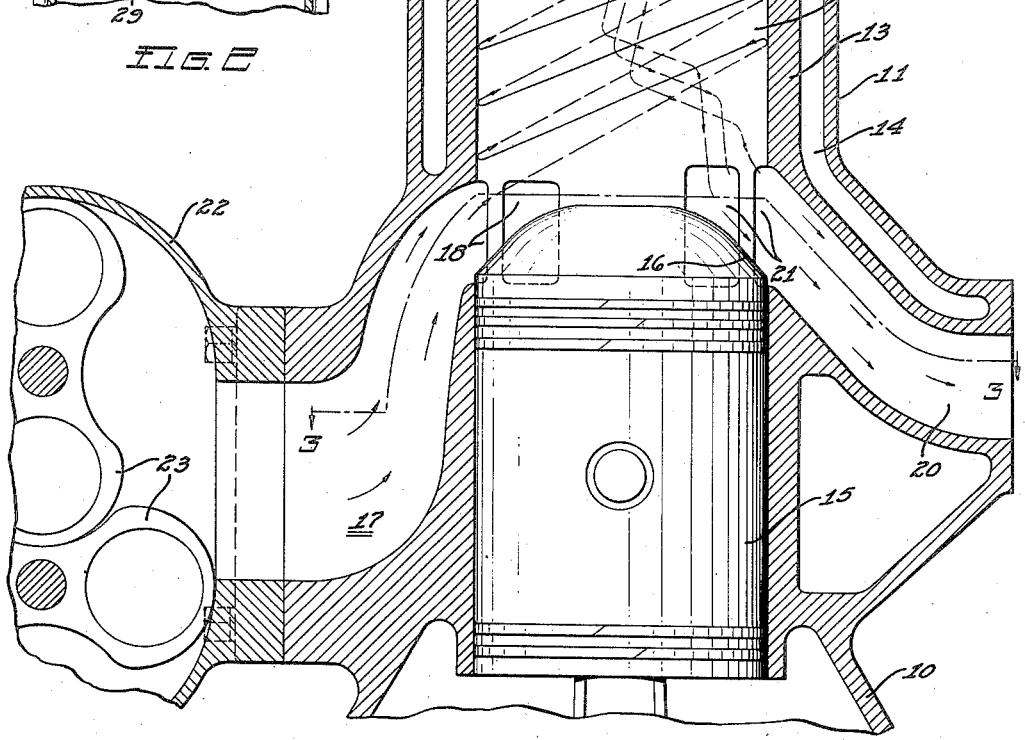
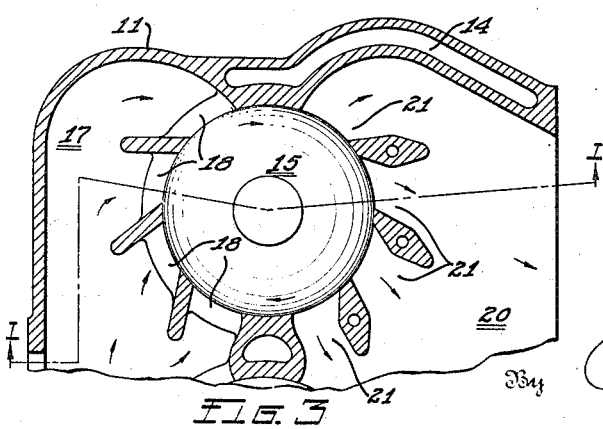
Inventor
HERBERT C. EDWARDS.

Patented Mar. 15, 1938

2,111,282

UNITED STATES PATENT OFFICE 2,111,282

INTERNAL COMBUSTION ENGINE

Herbert C. Edwards, Detroit, Mich., assignor to Packard Motor Car Company, Detroit, Mich., a corporation of Michigan Application June 7, 1934, Serial No. 729,390

14 Claims. (Cl. 123—65)

This invention relates to internal combustion engines and more particularly to engines of the compression-ignition type and the method of charging and scavenging the same. This application is a continuation in part of my pending application Serial No. 632,665, filed September 12, 1932.

In one type of compression-ignition engine, air and fuel oil are introduced separately into the combustion chamber or the cylinder where they are intermingled to form the combustible mixture. The injector must spray fuel oil into the air charges or the air charges must be moved to the injected fuel in a manner to obtain thorough intermingling. Directing fuel into the air is seldom done, however, because it requires a nozzle with a plurality of small openings which become quickly carbonized or otherwise stopped up.

It is desirable that the injection of fuel into the air be made when the air is under highest compression in order to utilize the maximum heat development for producing rapid combustion. When it is realized that engines of this type operate at more than 2,000 R. P. M., some idea can be had of the short space of time permissible for fuel and air to mix. It is quite ordinary for the injection period to take only .0015 of a second and, as explosion pressure increases with ignition delay after fuel enters the compressed air, the strength of the engine structure required must be commensurate with the combustion delay.

It is an object of this invention to provide a compression-ignition engine in which the combustion delay is of extremely short duration.

Another object of the invention is to provide a compression-ignition engine in which turbulence of compressed air is of such a character that fuel injected therein will commence to burn substantially immediately upon introduction.

Another object of the invention is to reduce the weight and increase the endurance of an engine structure of the compression-ignition type through means of a new and novel method of air and fuel control.

Still another object of the invention is to provide a control for combustion in internal combustion engines of the compression-ignition type such that fuel ignition will be gradual.

An object of the invention is to provide an engine in which air charges are introduced into the cylinders in a manner to completely evacuate the residual gas before the valves are closed and, at the same time, circulate the air in the cylinders so that, when liquid fuel is injected therein, efficient intermingling will be obtained.

Another object of the invention is to provide an engine in which incoming air charges are circulated to evacuate the exhaust gas in a manner such that there will be a minimum mixing therewith.

A further object of the invention resides in a new and novel manner of scavenging exhaust gas and mixing fuel charges in engines of the compression-ignition type whereby weight of the engine parts can be relatively low.

Still another object of the invention resides in the method of feeding and mixing air and fuel oil in order to speed up combustion.

A further object of the invention resides in the method of scavenging a two-cycle internal combustion engine wherein the incoming air charges are introduced in a manner to completely clear out the residual gas before the valves are closed.

Other objects of the invention will appear from the following description taken in connection with the drawing, which forms a part of this specification, and in which:

Fig. 1 is a vertical sectional view through an engine taken on line 1—1 of Fig. 3 illustrative of my invention;

Fig. 2 is a sectional view through the combustion chamber of the engine taken on line 2—2 of Fig. 1;

Fig. 3 is a sectional view taken on line 3—3 of Fig. 1 illustrating the air inlet and exhaust outlet arrangements.

Referring to the drawing by characters of reference, 10 indicates the upper section of a crank case upon which cylinder structure 11 is supported. The cylinder structure and the crank case are shown as an integral casting, however, they can be separately formed and secured together if desired. One or more cylinders 12 are contained in the cylinder structure and a wall, as indicated at 13, forms a space 14 around the cylinder for the purpose of receiving a cooling fluid to transfer heat. Within the cylinder is mounted a piston 15, of the reciprocable type, and the head end thereof is beveled around the perimeter as indicated at 16.

One side of the cylinder structure is formed with an air inlet chamber 17 with which passages 18, leading to the interior of the cylinder, connect. These passages are formed to extend at an angle to the cylinder axis and tangential to the inner perimeter of the cylinder so that air passing therethrough will be directed around the cylinder wall in a helical path toward the head. On the side of the cylinder structure opposite the air inlet chamber is an exhaust chamber 20 with which passages 21 leading from the interior of the cylinder communicate. These passages also extend at an angle to the cylinder axis and tangential to the inner perimeter of the cylinder.

The exhaust passages 21 communicate with the interior of the cylinder at a point slightly nearer the head end than the air inlet passages and thus the piston will uncover the exhaust passages in advance of the air inlet passages during its expansion or working strokes, and likewise the exhaust passages will be closed later than the air passages when the piston is moving in its compression stroke. The piston serves as the valve means for the passages and it is associated with the cylinder structure so that the beveled end 16 forms a continuation of a portion of the wall of the cylinder forming the inlet and outlet passages at the end of the power stroke, as shown in Fig. 1 of the drawing. This beveled portion of the piston thus serves as a guide to direct air into the cylinder and to direct exhaust from the cylinder. However, the inlet passage walls form the main guide for directing air movement into the cylinder.

A blower housing 22 is connected to the cylinder structure and communicates with the chamber 17 so that the pump or blowers 23 can force air into the cylinder through the passages 18. This blower structure can be of any conventional type and is preferably driven by suitable mechanism connected with a moving part of the engine.

A head bloc 24 is secured on the open end of the cylinder by means of bolts as indicated at 25. The bloc is formed with an axially extending opening the outer portion 26 of which is cylindrical and an intermediate portion 27 of which is circular and of larger diameter than the portion 26. The wall portion 28 forming the inner end of the opening is beveled and conforms in shape substantially to the beveled end of the piston which moves in close proximity thereto at one end of its stroke. Within the portions 26 and 27 of the recess in the head bloc I provide a removable insert having a body portion 29 and a neck or pilot portion 30. The body portion 29 fits into the recess 27 while the neck portion 30 extends through the recess portion 26 and is provided at its end with threads for engagement by a nut 31 employed to clamp the insert in place with the cylinder bloc. The body portion of the element is concentric with the recess portion 27 but of slightly less diameter in order to provide a space 32 open to the interior of the cylinder in which air can enter to serve as an insulation between the body portion of the insert and the adjacent wall of the cylinder head. A gasket 33 is interposed between the cylinder head and the body portion 29 in order to seal the interior of the cylinder from the portion 26 of the opening in the head. A circular combustion chamber 34 is formed within the body portion 29 of the insert and the inner face of the body is recessed and substantially complementary in form to the piston end which moves in close relation therewith at the end of the compression stroke. A restricted opening 35 connects the chamber 34 with the interior of the cylinder.

The insert is formed of material having high heat resisting qualities, for example, a mixture of chromium, nickel and iron, in order to withstand the heat to which it is subjected by compression and explosion temperatures. The air space 32 prevents heat from the insert from being quickly transferred to the cooling chamber 36 in the head structure.

An injection device 37 extends through an opening in the head bloc so that the nozzle end 38 is in communication with the chamber 34. The injection device is connected with a source of fuel oil supply and charges of fuel are forced through the nozzle into the chamber 34 by a suitable pump means conventional to engines of this type. A glow plug 39 is screwed into an opening 40 through the neck 30 and projects slightly into the chamber 34.

The engine illustrated is of the two-stroke cycle type in which the air charge is compressed and the liquid fuel is injected during one stroke of the piston and the expansion takes place on the return stroke of the piston, the air being admitted and the exhaust evacuated while the piston is traveling in the latter part of the expansion or working stroke and during the first part of the compression stroke. As the piston moves away from the cylinder head during the power stroke, the exhaust passages 21 are uncovered and, due to pressure interiorly of the cylinder, the residual gas will start to flow from the cylinder. The initial movement of exhaust through the angular and tangentially arranged exhaust passages will influence the movement of the exhaust remaining in the cylinder so that it will swirl helically toward the ports with the axis of the swirl normal to the angle of the air inlet passages.

As the piston continues its movement away from the cylinder head after opening the exhaust passages, air will be forced through the inlet passages 18 into the cylinder by the blower and will travel helically around the cylinder wall toward the cylinder head. This movement of the air has the general effect of a hollow column of air adjacent the cylinder wall, the axis of which is diagonal of the cylinder and substantially similar to the angle of the exhaust passages. This helical swirling movement of the air charge in the cylinder is indicated by lines and arrows in Fig. 1 of the drawing. The exhaust and the air first entering the cylinder are rotating in the same direction with the axes of their swirls extending in a similar direction.

Movement of the air column toward the cylinder head forces the outer portion of the exhaust before it so that it is forced to change its course and travel down through the core of the hollow column of air in a direct line with the angle of the exhaust passages although it continues to move helically. When the air stream reaches the head of the cylinder, it also must change its course and follow the exhaust traveling through the core of the air column toward the exhaust passages and this continues until only fresh air remains in the cylinder and the piston covers the inlet and outlet passages as it moves in its compression stroke.

It will be understood that this helically moving air will pass through the opening 35 into the chamber 34 and air movement into and out of the chamber during scavenging will clear the chamber of some of the exhaust which may possibly be trapped therein. As the piston continues to move toward the head after the inlet and outlet passages are closed, the air trapped in the cylinder continues to rotate but the helical direction of flow is flattened out so that the air revolves normal to the axis of the cylinder. As the piston continues to move toward the head, the rotating air is forced through the opening 35 into the chamber 34 and at the uppermost end of the compression stroke, the piston lies in close proximity to the recessed inner wall of the insert and to the wall forming the portion 28 of the opening in the head bloc. I propose that the space remaining in the cylinder exterior of the chamber 34 when the piston is at the end of its compression stroke should have about one fourth the area of the combustion chamber in the insert.

The diameter of the chamber 34 is arranged to be about one half that of the cylinder and the opening 35 connecting the chamber 34 with the cylinder is arranged to be substantially one fourth the diameter of the cylinder. Rotation of the air increases inversely with diameter, neglecting friction, and the axial speed of the air due to the piston movement increases inversely with the square of diameter. We thus see that the peripheral speed of the air in the chamber 34 is influenced by the reduction in the diameter of space and the axial velocity imparted by the piston. The increase therefore of the peripheral speed of the air in the chamber 34 over that at which it was rotating in the cylinder is the square root of the sum of the squares of the two component velocities. When the piston is substantially at top center, that is, at the end of the compression stroke, a charge of fuel oil is injected across the chamber 34 and ignition takes place substantially immediately whereupon explosion occurs and the piston is moved by the force thereof in its working and exhaust stroke.

The chambered insert 29, being formed of heat resisting material, will retain temperature developed therein by the heat of combustion and, because of the air space 32, this heat will only be slowly taken up by the cooling system in the head. This heated condition of the chamber will assist in vaporizing any particles of fuel oil coming in contact therewith and the rotation of the air will pick up such particles of oil from the wall of the chamber and cause them to be intermingled with the air. The high rotational velocity of the air in the confined chamber 34 will cause an extremely high turbulence and will serve to almost instantly completely mix the fuel particles with the air so that ignition thereof will proceed substantially as soon as they are injected into the combustion space. Quite obviously there is a small ignition delay but, by means of this form of turbulence, the delay is materially less than with any other form of engine of this general character of which I am aware. The fuel charge can thus be injected substantially at the end of the compression stroke when the highest temperature is developed and combustion is controlled so that the burning is gradual. In view of this, I have eliminated the high peak explosion pressures which occur when there is sudden ignition of the entire charge or of any major portion thereof and, as a result, the engine structure can be of less weight and will have greater endurance.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. The method of scavenging and charging an engine of the compression-ignition type comprising relieving expansion pressure directly through the walls of the cylinders in a manner to cause rotation of the exhaust gas when the pistons near the end of the power strokes, then introducing air under pressure into the cylinders to cause a whirling column to spiral around the exhaust in the cylinders in a direction opposite that in which the exhaust gas is passing from the cylinders, compressing the rotating air charges and displacing them axially through a restriction into a segregated chamber of relatively small area, and injecting liquid fuel into the air in the segregated chamber.

2. The method of scavenging and charging a cylinder of an internal combustion engine which comprises removing exhaust gas from the cylinder in a rotational direction angular to the cylinder axis, then introducing air under pressure into the cylinder diametrically from the exhaust outlet and in a tangential relation to the cylinder perimeter and at an angle to the axis thereof while the piston is near the end of the power stroke, compressing the rotating air in the cylinder and substantially displacing it therefrom through a restriction into a segregated combustion space of materially reduced area, and injecting liquid fuel into the air in the combustion space.

3. The method of scavenging and charging a cylinder of a two-cycle internal combustion engine comprising removing exhaust from the cylinder in a spiraling direction extending angularly to the axis, introducing compressed air into the cylinder in a direction to spiral around the exhaust and assist its outgoing movement in the direction mentioned, compressing the rotating air and moving it through a restriction into a segregated combustion chamber of restricted area, then injecting fuel oil into the compressed air rotating in the combustion chamber.

4. The method of scavenging and charging a cylinder of an internal combustion engine which consists in relieving expansion pressure directly from the interior of the cylinder when the piston is near the end of its power stroke in a manner to cause spiraling of the remaining exhaust in a direction away from the cylinder head, then introducing air under pressure into the cylinder to cause spiraling thereof in a direction toward the cylinder head around the inner perimeter of the cylinder in a column, and then compressing the retained air charge before introducing fuel.

5. The method of scavenging and charging a cylinder of an internal combustion engine which consists in relieving expansion pressure directly through the cylinder wall from the interior of the cylinder in a manner to cause rotation of the remaining exhaust when the piston nears the end of its power stroke, then introducing air under pressure into the cylinder to cause a whirling column to spiral around the inner cylinder perimeter toward the cylinder head in the same direction of rotation as that in which the remaining exhaust is moving, and then compressing the retained air charge before introducing fuel.

6. In an internal combustion engine, a cylinder structure having a cylinder with a closed head end, a group of air inlet passages in direct communication with the interior of the cylinder, a group of exhaust outlet passages in the structure diametrically of the group of inlet passages and communicating directly with the interior of the cylinder, the groups of passages extending normal relatively and at an angle to the cylinder axis and tangentially in different directions relatively to the inner perimeter of the cylinder, and a piston reciprocable in the cylinder, said piston serving as the valve means for both groups of passages.

7. In an internal combustion engine, a cylinder structure having a cylinder with a closed head end, a group of outlet passages in the structure in direct communication with the interior of the cylinder, said passages extending tangential to the inner perimeter of the cylinder and at an angle to the axis thereof, and a reciprocable piston in the cylinder serving as a valve means for the passages, said piston having a beveled edge surface around the perimeter of the head end which extends at substantially the same angle to the cylinder axis as the passages and terminates at the extreme head end thereof.

8. In an internal combustion engine, a cylinder structure having a cylinder with a closed head end, a group of air inlet ports and a group of exhaust outlet passages in the structure communicating directly with the interior of the cylinder, said groups of passages extending normal relatively and at an angle to the axis and tangential to the inner perimeter of the cylinder, and a reciprocatory piston in the cylinder serving as valve means for the groups of passages, said piston having the head end reduced to form a surface extending substantially in line with the end portions of the passage junctions.

9. The method of scavenging a cylinder of an internal combustion engine which comprises removing exhaust gas in an angular direction from the cylinder, and then introducing air under pressure into the cylinder diametrically from the exhaust gas outlet and in a tangential relation to the cylinder perimeter and at an angle to the axis thereof while the piston is near the end of its power stroke, thereby directing the air to flow in a hollow column with its axis extending angularly to the cylinder axis and coinciding with the direction in which exhaust gas moves out of the cylinder.

10. The method of scavenging and charging a cylinder of an internal combustion engine which consists in relieving expansion pressure directly from the interior of the cylinder when the piston is near the end of its power stroke in a manner to cause spiraling of the exhaust in a direction away from the cylinder head and at an angle to the cylinder axis, then introducing air under pressure into the cylinder to cause spiraling movement thereof in a direction toward the cylinder head and around the inner perimeter of the cylinder in the form of a hollow column having the same axis as that of the spiraling exhaust gas, and then compressing the retained air charge before introducing fuel.

11. In an internal combustion engine, a cylinder structure comprising a cylinder with a closed head end, a group of air inlet passages in the structure in direct communication with the interior of the cylinder and extending tangentially thereof, a group of exhaust outlet passages in the structure in direct communication with the interior of the cylinder and extending tangentially thereof, said groups of passages extending at an angle to the axis of the cylinder and in opposite directions tangentially and a power piston in the cylinder serving as a valve for the groups of passages.

12. In an internal combustion engine, a cylinder structure including a cylinder with a closed head end, two groups of diametrically disposed passages in the structure communicating directly with the interior of the cylinder and extending substantially tangential to the inner perimeter thereof at substantially opposite angles, one group of passages communicating with a forced air supply and the other group communicating with an exhaust outlet, and a piston in the cylinder serving as a valve for the groups of passages.

13. In an internal combustion engine, a cylinder structure having a cylinder with a closed head end, a group of adjacent air inlet passages in the structure communicating directly with the interior of the cylinder, a group of adjacent exhaust passages in the structure in direct communication with the interior of the cylinder and arranged diametric of the inlet group of passages, said groups of passages being arranged at different angles tangentially of the inner perimeter of the cylinder and at opposite angles to the axis of the cylinder, the walls of the end inlet passages being formed to curve away from the adjacent exhaust passages, and a reciprocable piston in the cylinder controlling the groups of passages.

14. A multi-cylinder engine comprising a row of two-cycle cylinders each having zones of piston-controlled air and exhaust ports, the air ports being individually inclined to their respective cylinder radii so as to whirl the cylinder contents about the cylinder axis and the exhaust ports being individually inclined in the reverse sense to their respective radii to facilitate the whirling motion.

HERBERT C. EDWARDS.